(12) United States Patent  (10) Patent No.: US 9,839,317 B1
Patterson  (45) Date of Patent: Dec. 12, 2017

(54) COOKING IMPLEMENT

(71) Applicant: Robert M. Patterson, Plymouth, MI (US)

(72) Inventor: Robert M. Patterson, Plymouth, MI (US)

(73) Assignee: Robert M. Patterson, Plymouth, MI (US)

( * ) Notice: Subject to any disclaimer, the term of this patent is extended or adjusted under 35 U.S.C. 154(b) by 0 days.

(21) Appl. No.: 15/181,029

(22) Filed: Jun. 13, 2016

(51) Int. Cl.
 A47J 36/34 (2006.01)
 A47J 27/00 (2006.01)
 A47J 36/02 (2006.01)
 A47J 45/06 (2006.01)
 A47J 45/08 (2006.01)
 B65D 25/28 (2006.01)

(52) U.S. Cl.
 CPC ............ *A47J 27/002* (2013.01); *A47J 36/02* (2013.01); *A47J 45/061* (2013.01); *A47J 45/085* (2013.01)

(58) Field of Classification Search
 CPC ........ A47J 27/002; A47J 36/02; A47J 45/061; A47J 45/085
 USPC ......... 220/573.1, 573.2, 629, 631, 753, 756, 220/762, 765
 See application file for complete search history.

(56) References Cited

U.S. PATENT DOCUMENTS

| | | | | |
|---|---|---|---|---|
| 1,021,425 A * | 3/1912 | Osborn | ................ | F16M 11/10 220/756 |
| 1,904,925 A * | 4/1933 | Perks | ................ | A47J 37/10 126/215 |
| D245,059 S * | 7/1977 | Bardin | ................ | D7/361 |
| 4,868,360 A * | 9/1989 | Duncan | ................ | A47J 36/027 219/728 |
| 5,307,951 A * | 5/1994 | Kuhn | ................ | A47J 27/002 220/771 |
| 5,666,875 A * | 9/1997 | Wener | ................ | A47J 36/06 220/4.24 |
| 6,029,843 A * | 2/2000 | Kroscher | ................ | A47J 36/08 220/367.1 |
| 6,135,309 A * | 10/2000 | Royster | ................ | B65D 19/10 220/1.5 |
| D543,773 S * | 6/2007 | Reckert | ................ | D7/360 |
| 8,484,805 B2 * | 7/2013 | Munari | ................ | A47J 45/071 16/422 |
| 2008/0017047 A1 * | 1/2008 | Stanczak | ................ | A47J 37/108 99/357 |
| 2013/0092695 A1 * | 4/2013 | Yeh | ................ | A47J 36/00 220/573.1 |
| 2014/0183199 A1 * | 7/2014 | Thompson | ................ | A47J 27/002 220/573.1 |
| 2015/0108143 A1 * | 4/2015 | Groll | ................ | A47J 36/02 220/573.2 |

(Continued)

*Primary Examiner* — J. Gregory Pickett
*Assistant Examiner* — Niki M Eloshway
(74) *Attorney, Agent, or Firm* — Vincent N. Mastrogiacomo; Raymond J. Vivacqua

(57) ABSTRACT

A compact cooking implement includes a pan, a top flange, a handle, and a stand flange. The pan has a rectangular bottom and four perpendicular walls. One of the four walls extends from each of four edges of the bottom. The top flange is disposed on a top edge of the walls of the pan. The top flange extends perpendicularly outward from a top edge of each of the four walls. The handle extends outwardly from the top flange. The stand flange extends from the top flange outwardly at an angle from a plane including the top flange.

13 Claims, 2 Drawing Sheets

(56) References Cited

U.S. PATENT DOCUMENTS

2016/0066736 A1\* 3/2016 Pastor .................. A47J 27/002
99/449

\* cited by examiner

COOKING IMPLEMENT

FIELD

The invention relates generally to cooking implements and more specifically to compact cooking implements adaptable to alternative heat sources.

BACKGROUND

The statements in this section merely provide background information related to the present disclosure and may or may not constitute prior art.

Outdoor sporting activities have long been a source of enjoyment for people. Hunting, camping, hiking, fishing, canoeing, etc., are just some of the ways people take advantage of the opportunity to get back to nature in the woods, on the lakes and streams, and in the mountains. When people make their way outdoors many also choose to do their cooking and eating as a more immersive way of enjoying the experience. Traditionally, some of the usual cooking methods include using campfires, propane stoves, charcoal or gas grills, a heat sources.

More recently, people have been attempting to extend their outdoor season into colder months or be more comfortable during the hunting season by using portable heaters to keep warm. Some portable heaters offer yet another heat source by which one can utilize to cook. People wanting to cook or warm food using portable heaters have attempted to do so with limited success while increasing the hazards of fire, etc. Therefore, to this point, there has been no development regarding cooking implements for safe use in conjunction with portable heaters. Thus, there is a need in the art for a new compact, lightweight, and durable cooking/food warming implement for safe use with portable heaters or other alternative types of heat sources.

SUMMARY

A compact cooking implement is provided, the compact cooking implement including a pan, a top flange, a handle, and a stand flange. The pan has a rectangular bottom and four perpendicular walls. One of the four walls extends from each of four edges of the bottom. The top flange is disposed on a top edge of the walls of the pan. The top flange extends perpendicularly outward from a top edge of each of the four walls. The handle extends outwardly from the top flange. The stand flange extends from the top flange. The stand flange extends outwardly at an angle from a plane including the top flange.

In another example of the present invention, the angle between the stand flange and the top flange is about 65°.

In yet another example of the present invention, the stand flange is further disposed on an opposite edge of the top flange from the handle.

In yet another example of the present invention, the handle includes a heat resistant coating, a carrier hole, and a curved profile.

In yet another example of the present invention, the cooking implement further includes a hinge disposed on the top flange. The stand flange is rotatably supported by the hinge.

In yet another example of the present invention, the stand flange includes a stop portion proximate the hinge and the stop portion contacts an underside surface of the top flange to prevent further rotation in a first direction.

In yet another example of the present invention, the implement is manufactured from stainless steel using a stamping method.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
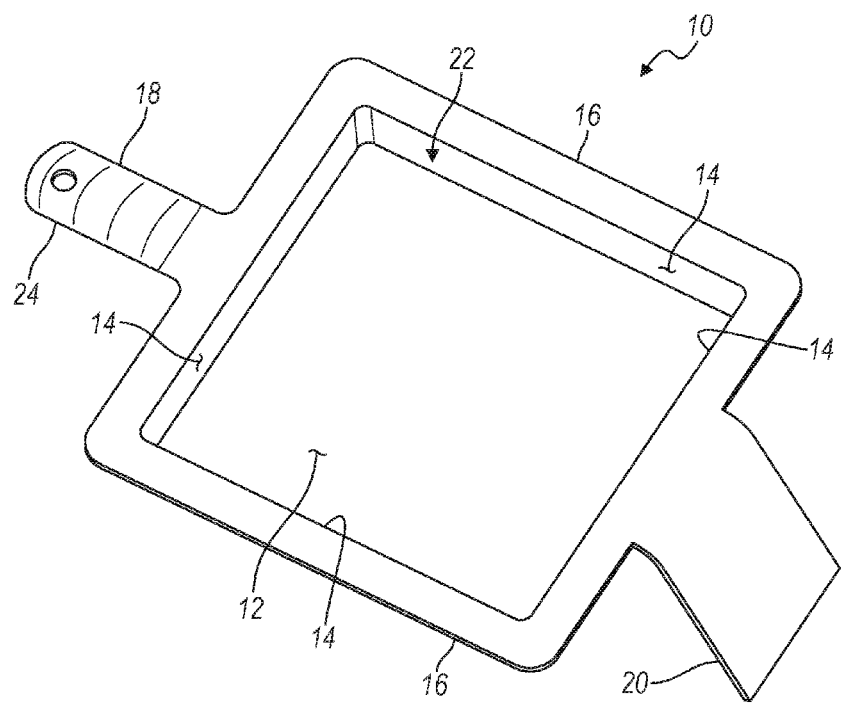
FIG. 1 is a perspective view of an exemplary cooking implement, according to the present invention.
Figure 2:
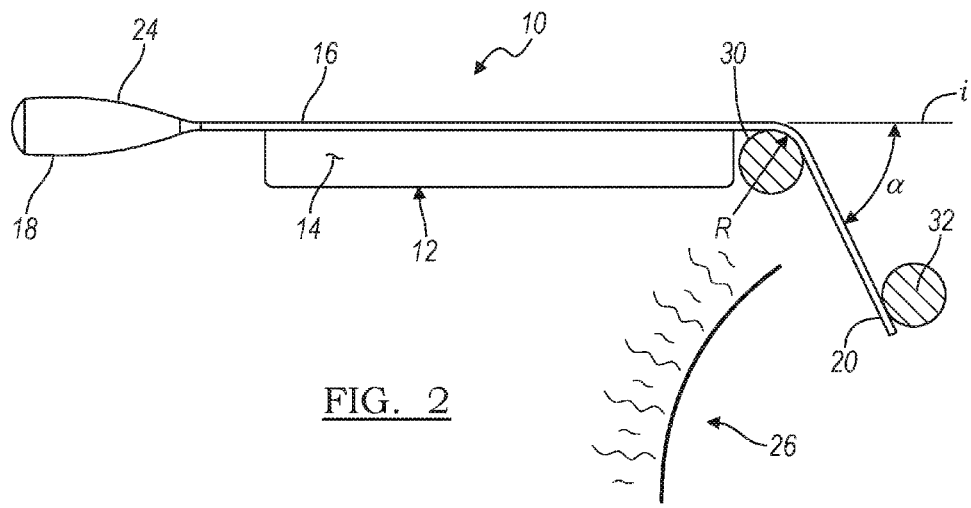
FIG. 2 is a side view of an exemplary cooking implement, according to the present invention.

With reference to FIGS. 1 and 2, a compact, portable cooking implement or pan 10 is illustrated and will now be described. The compact cooking implement 10 includes a cooking surface or bottom 12, a plurality of vertical sides or walls 14, a top flange 16, a handle 18, and a stand flange 20. More specifically, the sides 14 of the compact cooking implement 10 are disposed on the outer perimeter of the horizontal bottom 12 and extend perpendicularly from the bottom 12. Thus, the sides 14 and the bottom 12 combine to form a shallow bowl or pan 22 having solid surfaces preventing any liquids that may be in the pan 22 initially from dripping out of the pan 22. Additionally, the pan 22 preferably has a generally square or rectangular shape. However, other shapes, such as circular or oval, may also be considered without departing from the scope of the present invention.

The top flange 16 extends perpendicularly outward from the sides 14 of the compact cooking implement 10. The top flange 16 purposefully deflects excess heat outside of the compact cooking implement 10 when the compact cooking implement 10 is placed above a heat source 26. The handle 18 is disposed at the edge of the top flange 16 and extends outwardly. The shape of the handle 18 begins at the top flange 16 as flat and transitions into a gentle radius at its terminal end. Additionally, the handle 18 includes a heat resistant coating 24 for handling comfort and a carrier bore or hole 26 for ease of transport.

The stand flange 20 initially extends outwardly from the top flange 16 on a side of the compact cooking implement 10 that is opposite the side on which the handle 18 is disposed. Shown more directly in FIG. 2, the stand flange 20 includes a radius r that extends the stand flange at an angle α from the top flange 16. In a preferred example of the present invention, the angle α is approximately 65° from the reference line i which is co-linear to the top flange 16, however, other angles may be considered without departing from the scope of the invention.

As shown in the side view of FIG. 2, the stand flange 18 is disposed between two grounded members 30, 32 such that the remainder of the compact cooking implement 10 is cantilevered over the top of the heat source 26. In some examples, the members 30, 32 are a part of the heat source 26 mechanism. In either case, the handle 18 is extended away from the heat source to help prevent overheating the handle and thus leading to a handle that is uncomfortable to the touch. Still, other handle configurations may be considered including two side handles or a bail handle, without departing from the scope of the invention.

Figure 3:
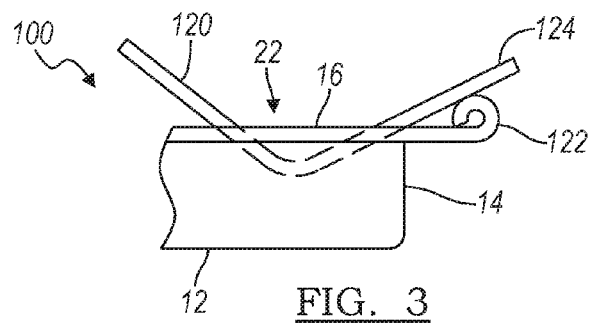
FIG. 3 is a side view of a portion of an exemplary cooking implement, according to the present invention.
Figure 4:
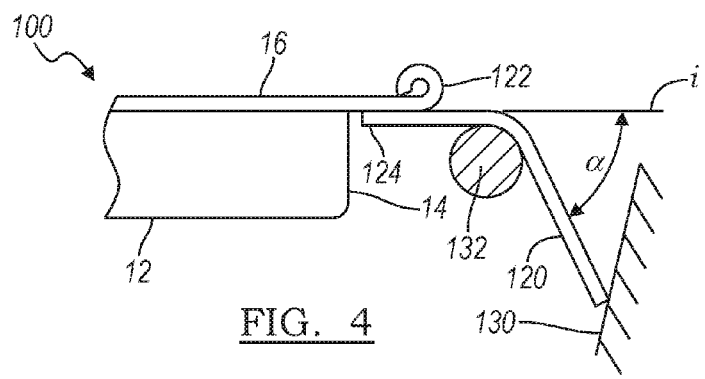
FIG. 4 is a side view of a portion of an exemplary cooking implement, according to the present invention.
Figure 5:
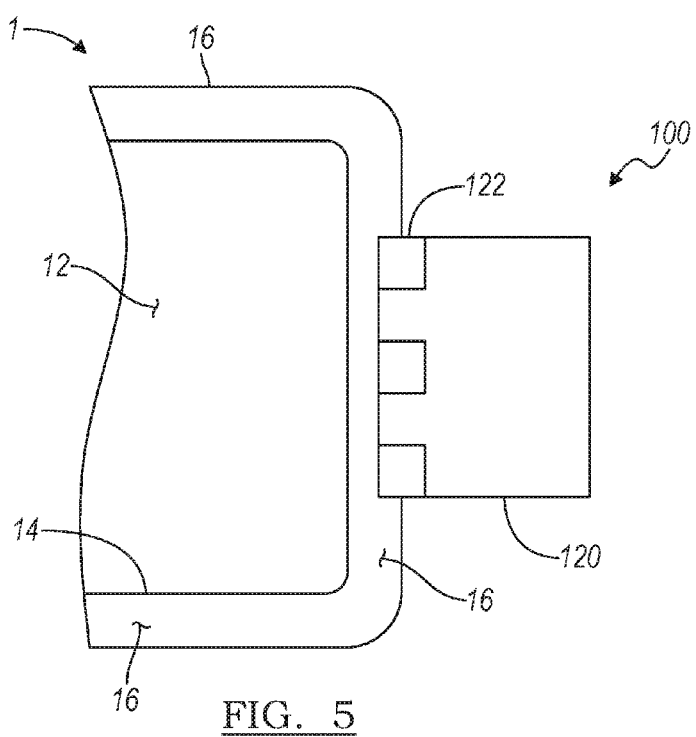
FIG. 5 is a top view a side view of a portion of an exemplary cooking implement, according to the present invention.

Turning now to FIGS. 3-5, another example of a compact cooking implement 100, according to the present invention, is illustrated and will now be described. In FIGS. 3-5, reference numbers are carried over from FIGS. 1 and 2 when referring to the same or similar features of the invention. More specifically, the compact cooking implement 100 includes an alternative feature to extend the stand flange 120 from the top flange 16. The compact cooking implement 100 includes a hinge 122 connecting the stand flange 120 to the top flange 16. The stand flange 120 is connected to the hinge 122 such that a portion of the stand flange 120 referred to as a stop 124 extends under the top flange 16 to prevent the stand flange 120 from over rotating. As in FIGS. 1 and 2, the stand flange 120 rotates to approximately 65° from the top flange 16, however, other angles may be considered without departing from the scope of the invention. When not in use, the stand flange 120 rotates back into the bowl or pan 22 to provide for a more compact cooking implement. Also shown in FIG. 4 is the how the stand flange 120 may be utilized with two grounded members 130, 132 to cantilever the compact cooking implement 100 over the heat source.

The compact cooking implement 10, 100 may be manufactured using a stamping process using a stainless steel material. However, other manufacturing processes may be considered using alternative materials. For example, the compact cooking implement 10, 100 may be cast or stamped from lightweight aluminum having a high heat transfer rate and anti-corrosive properties.

The description of the invention is merely exemplary in nature and variations that do not depart from the gist of the invention are intended to be within the scope of the invention. Such variations are not to be regarded as a departure from the spirit and scope of the invention.

The following is claimed:

1. A compact cooking implement, the compact cooking implement including:
   a pan having a bottom and a side, and wherein the side extends perpendicularly from a perimeter of the bottom;
   a top flange disposed on a top edge of the sides of the pan, and wherein the top flange extends perpendicularly outward from a top edge of the side;
   a handle disposed on an edge of the top flange;
   a stand flange extending from the edge of the top flange, and wherein the stand flange extends outwardly at an angle from a plane including the top flange; and
   a hinge disposed on the top flange, and
   wherein the stand flange is rotatably supported by the hinge, the stand flange includes a stop portion proximate the hinge and the stop portion contacts an underside surface of the top flange to prevent further rotation in a first direction.

2. The compact cooking implement of claim 1 wherein the angle between the stand flange and the top flange is between about 60° and 70°.

3. The compact cooking implement of claim 2 wherein the angle between the stand flange and the top flange is about 65°.

4. The compact cooking implement of claim 1 wherein the stand flange is further disposed on an opposite edge of the top flange from the handle.

5. The compact cooking implement of claim 1 wherein the handle includes a heat resistant coating and a carrier hole.

6. The compact cooking implement of claim 1 wherein the bottom of the pan has a square shape and has a continuous surface.

7. The compact cooking implement of claim 1 wherein the implement is manufactured from stainless steel using a stamping method.

8. A compact cooking implement, the compact cooking implement including:
   a pan having a rectangular bottom and four perpendicular walls, and wherein one of the four walls extends from each of four edges of the bottom;
   a top flange disposed on a top edge of the walls of the pan, and wherein the top flange extends perpendicularly outward from a top edge of each of the four walls;
   a handle extending outwardly from the top flange; and
   a stand flange extending from the top flange, and wherein the stand flange is a flat planar member having a thickness approximately equal to a thickness of the bottom of the pan and extends outwardly at an angle of about 65° from a plane including the top flange.

9. The compact cooking implement of claim 8 wherein the stand flange is further disposed on an opposite edge of the top flange from the handle.

10. The compact cooking implement of claim 8 wherein the handle includes a heat resistant coating, a carrier hole, and a curved profile.

11. The compact cooking implement of claim 8 further including a hinge disposed on the top flange, and wherein the stand flange is rotatably supported by the hinge.

12. The compact cooking implement of claim 11 wherein the stand flange includes a stop portion proximate the hinge and the stop portion contacts an underside surface of the top flange to prevent further rotation in a first direction.

13. The compact cooking implement of claim 8 wherein the implement is manufactured from stainless steel using a stamping method.

* * * * *